Nov. 11, 1958     O. C. MILLHOFF     2,859,477
MOLD SEPARATOR DEVICE
Filed July 28, 1953     2 Sheets-Sheet 1
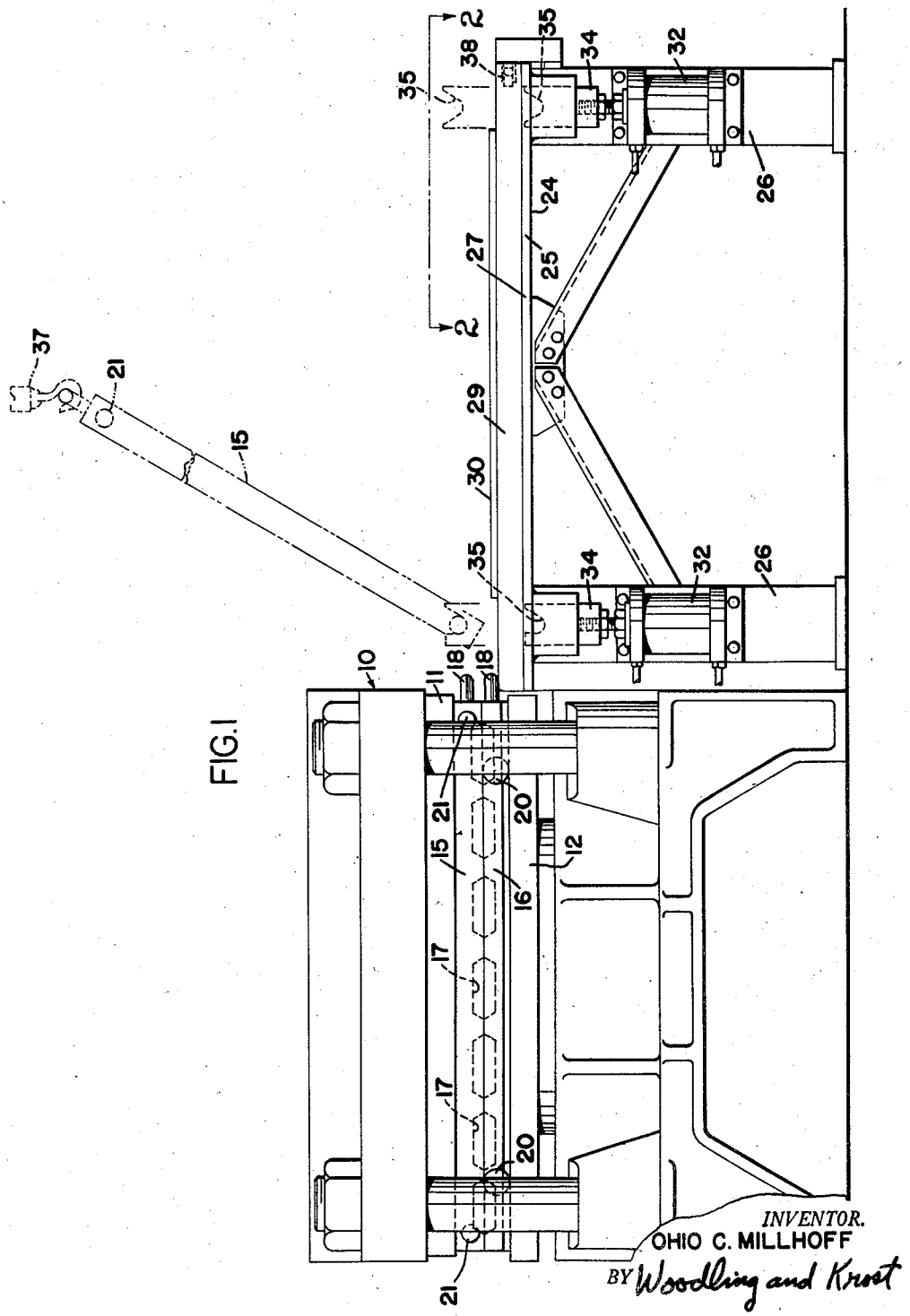
INVENTOR.
OHIO C. MILLHOFF
BY Woodling and Krost
ATTORNEYS Nov. 11, 1958     O. C. MILLHOFF     2,859,477
MOLD SEPARATOR DEVICE
Filed July 28, 1953     2 Sheets-Sheet 2
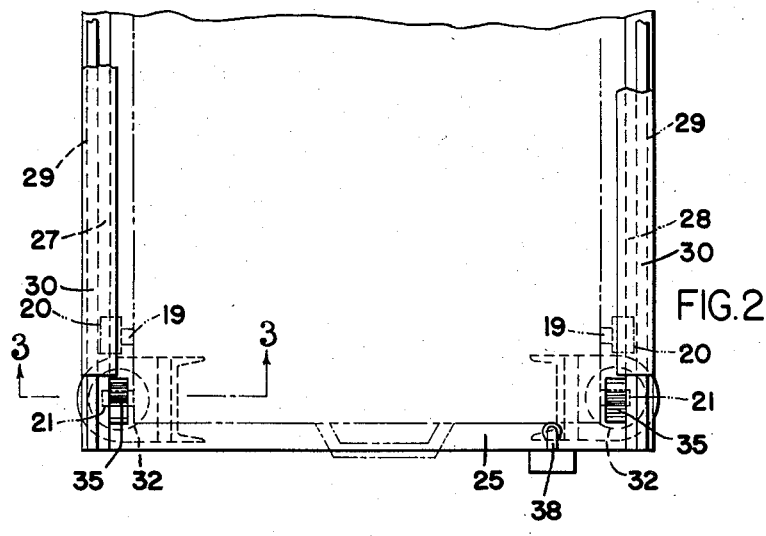
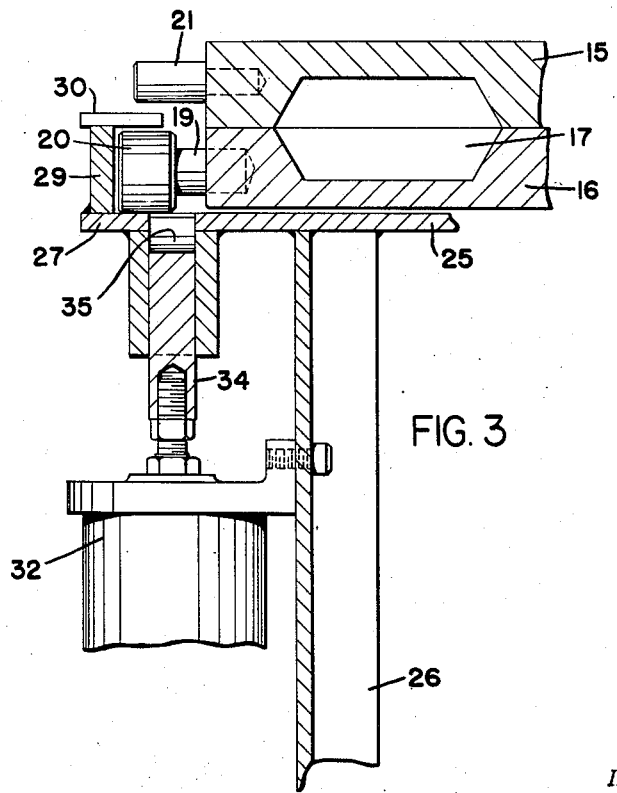
INVENTOR.
OHIO C. MILLHOFF
BY Woodling and Kroet
ATTORNEYS

2,859,477
MOLD SEPARATOR DEVICE

Ohio C. Millhoff, Barberton, Ohio, assignor to The Nye Rubber Company, Barberton, Ohio Application July 28, 1953, Serial No. 370,754

2 Claims. (Cl. 18—42)

This invention relates to rubber molding apparatus in general, and relates more specifically to a mold separator device to open mated mold members.

An object of this invention is to provide apparatus to break apart mated mold members and to swing the members apart to a convenient position for servicing the mold and removing finished product.

Another object of this invention is to provide such separator device with a bed adapted to hold one part of a mold couple and force the other part off the part so held.

Still another object of the invention is to provide the bed with facing channel sections to receive the wheels of a mold carriage, and elevator rams to engage and lift the top off a mold couple.

Yet another object of this invention is to provide the elevator device in the form of upwardly opening slots to engage laterally extending pins of the top mold and set as pivotal supports for the pins.

And another object of this invention is to provide locator switch means to prevent operation of the elevator except when the mold is properly located with respect to the elevator.

Other objects and a fuller understanding of the invention may be had by referring to the following description and claims, taken in conjunction with the accompanying drawings, in which:

Figure 1 is a side elevational view of a conventional rubber molding platten press, with the mold separator device of this invention associated therewith;

Figure 2 is a partial top view of the mold separator device as viewed along line 2—2 of Figure 1; and Figure 3 is a sectional illustration taken along line 3—3 of Figure 2.

In Figure 1 of the drawings a conventional rubber molding press 10 is shown as an example of the type of equipment with which the present invention may be employed. Press 10 employs a stationary platten and a moveable platten operated by a hydraulic ram which is not shown. The plattens move relative to one another and are heated.

The usual type of rubber mold comprises a mold couple mated together to define a rubber molding cavity within the couple. In the Figure 1 a mold member 15 and a mold member 16 are mated to define a plurality of cavity chambers 17 therein. There are many methods for causing rubber to enter into the cavity chambers 17, the conventional method being to place a slug of rubber in each cavity before the mold members are closed upon one another. Furthermore, there are similar types of molding structures employing two mold sections for molding materials other than rubber. Regardless of the materials being molded, the apparatus of this invention will serve the same purpose.

When two mated mold members, such as the mold members 15 and 16, have been closed under high pressure within the platten 11 and 12 of a press, a very considerable force must be exerted to open the mold for servicing and removing the molded articles from the cavities 17. In smaller mold structures pinch bars and levers are normally employed with success. However, whenever the mold sizes become too large and the cavities within them are large, usually a considerable force is required to open the molds, and the time and energy consumed materially reduces the efficiency of the worker in a very short period of time. The mold members are quite heavy and hot, and consequently, the more manual labor which must be exerted upon the molds, the sooner workman fatigue will reduce production.

Consequently, the mold separator device illustrated generally by the reference character 24 is provided to quickly and conveniently break the mold members 15 and 16 apart, and swing the mold member 15 away from the mold member 16 for convenience in removing the molded articles and supplying new slugs of uncured rubber stock, in the case of rubber molding.

The mold separator device 24 may be built in various forms, but for the sake of illustrating the inventive principle involved, the separator 24 is illustrated as having a bed area 25 supported upon legs 26. Two longitudinal rails 27 and 28 extend longitudinally of the bed 25, and define tracks from the opening of the press 10.

The mold member 16 is provided with stub shafts 19 and roller wheels 20 near the four corners thereof in order to serve as carriage means to roll the molding couple between the mold separator 24 and the press 10. The plattens of the press are designed to pick up the mold couple and press directly upon the faces of the mold rather than upon the wheels 20.

The mold member 15 is provided with a plurality of laterally extending pins 21 near the four corners thereof, and preferably spaced a longitudinal distance greater than the position of the wheels 20.

Handles 18 are provided on both mold members 15 and 16 for convenience in grasping the mold couple for moving it from the press onto the rails 27 and 28.

The separator 24 is provided with cover plates 30 over the rails 27 and 28, at least in the areas where the wheels 20 rest whenever the mold couple is in full proper position upon the separator device 24. A spacer block 29 as best illustrated in Figure 3 is employed to position the cover plates 30 a proper distance above the wheel 20. The block 29 and plate 30 may be welded or otherwise constructed into a unitary structure.

In order to break the mold member 15 away from the mold member 16, elevator means are provided to rise and engage the pins 21. It is found to be convenient to employ four individual hydraulic rams 32 for this purpose in order to minimize structural framework. The rams 32 are fitted with contact members 34 having vertically extending slots 35 in the top thereof. The slots 35 are generally flared in order to engage the pins 21, even if the pins might possibly be slightly out of proper alignment and to guide the pins down into the apex of the slot 35.

In operation, the mold couple is pulled out of the press 10 upon its carriage device and onto the separator 24. The wheels 20 roll longitudinally along the rails 27 and 28 under the cover plates 30. The cover plates prevent vertical movement of the mold member 16, but do not prevent vertical movement of the mold member 15. The rams 32 are then actuated to engage pins 21 and force mold member 15 upwardly off of the mold member 16.

Although the workmen can generally judge the proper position of the mold couple upon the separator device 24, it has been found to be convenient to provide a locator switch 38 to be contacted by the mold couple when in proper position. The switch 38 is in control of the hydraulic rams 32, that is, the rams 32 cannot be actuated until the mold couple is in contact with switch 38. Thereafter, the manual control means which is conventional and, therefore, not shown, may be operated to actuate the rams 32 and break the mold couple. Any slight variation in the position of the mold couple will be compensated for by the tapering nature of the slot 35.

Although the described apparatus will break the mold couple apart, the interior of the mold is yet not accessible. It is very simple to employ a light weight electric hoist 37 for this purpose, although other types of lifting devices may very readily be provided. The pins 21 which engage into the rear contact members 34 serve as pivots about which the mold member 15 may be pivoted. For this purpose, the slot 35 in the rear contact members 34 are provided with steep sloping backsides in order to discourage the pins from slipping out of the slot while the mold member 15 is being pivoted from a level position to the opened position illustrated in the dotted outline of Figure 1.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a mold couple comprising a top and bottom mold plate matable together to define molding cavity means therebetween, said bottom mold plate having four laterally extending carriage wheels spaced to roll the couple along suitable rail surfaces, said top mold place having four laterally extending lift pins spaced around the periphery thereof, a mold receiving bed having two laterally spaced substantially horizontal rails to carry said carriage wheels, locator means determining an engaged position of said mold couple on said rails, lock plate cover means over the wheels in said engaged position, said rails and lock plate cover means defining opposed longitudinal slots in which said carriage wheels may roll longitudinally and be held against vertical movement, four elevator members including hydraulic rams with vertically slotted contact members spaced below said lift pin members of the top mold plate, said contact members being elevatable to engage said pins and lift said top mold plate off said bottom plate, said slots also serving as pivot sockets in which said pins may pivotally support the top mold while one end thereof is further lifted to open said mold couple, and control means for said elevator members, said control means positioned to be activated by said mold couple in said engaged position, whereby said elevator members can be operated only when the mold couple is properly located.

2. In combination, a mold couple comprising a plurality of mold plates matable together to define molding cavity means, said plurality of molds stacked together with one such plate designated as a base plate, means to drive said stack along suitable rail surfaces, a mold receiving bed having surfaces defining opposed longitudinal slots, said base plate carrying anchor means positioned to enter said opposed slots upon driving said stack upon the bed and thereby hold said base plate against vertical movement, elevator means having lift members movable upwardly along opposite sides of said bed, said mold plates other than said base plate having catch surfaces, said lift members having top slotted contact members spaced below said catch surfaces, said contact members being elevatable to engage said catch surfaces and separate said plates, said top slots also serving as pivot sockets in which said catch surfaces may pivotally support the engaged plates while one end thereof is further lifted to open the mold couple, and control means for said elevator members, said control means positioned to be activated by said mold couple in said engaged position, whereby said elevator members can be operated only when the mold couple is properly located.

References Cited in the file of this patent

UNITED STATES PATENTS

| | | |
|---|---|---|
| 1,609,701 | Doty | Dec. 7, 1926 |
| 1,671,304 | Midgley | May 29, 1928 |
| 1,671,355 | Dexter | May 29, 1928 |
| 1,701,859 | McChesney | Feb. 12, 1929 |
| 1,880,462 | Mullin | Oct. 4, 1932 |
| 1,891,976 | Goebel | Dec. 27, 1932 |
| 2,171,511 | Winegar et al. | Aug. 29, 1939 |
| 2,231,254 | Cleveland | Feb. 11, 1941 |